United States Patent [19]

Ruhoff et al.

[11] Patent Number: 4,981,887
[45] Date of Patent: Jan. 1, 1991

[54] CATIONIC ELECTRODEPOSITION COMPOSITIONS FOR PRODUCING CHIP-RESISTANT FILMS

[75] Inventors: Philip J. Ruhoff, Minneapolis; Rodney W. Stockstad, Plymouth; James A. Prevost, Bloomington; Larry B. Brandenburger, Lino Lakes, all of Minn.; Robert B. Edenborg, Beaver Dam, Wis.

[73] Assignee: The Valspar Corporation, Minneapolis, Minn.

[21] Appl. No.: 457,409

[22] Filed: Dec. 28, 1989

Related U.S. Application Data

[63] Continuation-in-part of Ser. No. 234,482, Aug. 19, 1988 abandoned.

[51] Int. Cl.$^5$ .............................................. C08L 67/06
[52] U.S. Cl. ................................. 523/501; 204/181.6; 524/816; 524/901
[58] Field of Search ................ 524/816, 901; 523/501; 204/181.6

[56] References Cited

U.S. PATENT DOCUMENTS 4,511,692  4/1985  Anderson et al. ................... 524/901
4,547,556  10/1985  Hughes et al. .......................... 526/95

Primary Examiner—Veronica P. Hoke
Attorney, Agent, or Firm—James R. Haller; Gregory P. Kaihoi; Mary P. Bauman

[57] ABSTRACT

To improve chip resistance of an alkyd-type electrodepositable coating composition, there may be added to the composition an ethylenically unsaturated, addition-polymerizable monomer or oligomer having a substantially linear backbone, having a molecular weight of at least about 150, and being reactive with fatty acid unsaturation of the alkyd.

20 Claims, 2 Drawing Sheets

CATIONIC ELECTRODEPOSITION COMPOSITIONS FOR PRODUCING CHIP-RESISTANT FILMS

CROSS REFERENCE TO RELATED APPLICATIONS

This application is a continuation-in-part of U.S. application Ser. No. 234,482 filed Aug. 19, 1988, now abandoned.

BACKGROUND OF THE INVENTION

Coating compositions that are applied by electrical deposition procedures are known in the field and are described, for example, in U.S. Pat. No. 4,547,556 (Hughes, et al.) and 4,511,692 (Anderson, et al.). The electrodeposition compositions described in the last-mentioned patent provide excellent protective films that can be adequately cured at temperatures of 100°–175° C. or less. Such cured films commonly are used as protective paint coatings for farm implements and for other products that are exposed to environments in which the coatings may be impacted by sand, sharp rocks or the like that tend to chip the coatings. Although the coatings described in the last-mentioned patent are excellent from the standpoint of chemical resistance and protection of underlying substrates, it is desired to improve the chip-resistance of such coatings without significantly changing the electrodeposition or heat cure requirements.

BRIEF SUMMARY OF THE INVENTION

The present invention provides an alkyd-type, chip-resistant cationic electrodeposition coating composition that is curable at relatively low temperatures and which forms a film that is highly resistant to chipping from flying stones and the like. The coating composition includes a modified alkyd composition comprising the reaction product of (1) an alkyd derived from the reaction of a polyol with at least one unsaturated fatty acid, and (2) ethylenically unsaturated monomers including an amine-functional unsaturated monomer in a guantity sufficient to render the coating composition water-dispersible and cationically electrodepositable.

The coating composition includes a reactive agent in sufficient quantity to substantially improve the resistance to chipping of a cured coating resulting from the electrodeposition of the composition upon a metal substrate, the agent including at least one ethylenically unsaturated, addition polymerizable monomer or oligomer having a substantially linear backbone, having a molecular weight of at least about 150, being polymerizable under free radical initiating conditions. The reactive agent desirably is soluble in aromatic organic solvents such as toluene or aliphatic solvents such as alcohols, glycol ethers, and ketones, and desirably is blended into the modified alkyd composition resulting from the reaction of the base alkyd with ethylenically unsaturated monomers including the amine-functional unsaturated monomer.

In a preferred embodiment, the base alkyd is derived from the reaction of at least one polyol and unsaturated fatty acid, and a carboxyl, hydroxyl or amine functional addition polymerized elastomer in sufficient quantity to substantially improve the chip resistance of the cured coating resulting from the electrodeposition of the composition upon a metal substrate. In this preferred composition, chip resistance is provided both by the addition of the previously mentioned monomers or oligomers to the modified alkyd and by the incorporation via covalent bonding into the base alkyd, during its preparation, of the functional addition polymerized elastomer.

In another embodiment, additional chip resistance is obtained by including, with the ethylenically unsaturated amine functional monomer and other ethylenically unsaturated monomers that are reacted in the presence of the alkyd to form the modified alkyd composition, a monomer having a molecular weight of at least about 200 and having two different ethylenically unsaturated groups. One of these unsaturated groups, termed "primary" herein, is capable of participating in a free radical-initated addition polymerization reaction and the other, less reactive ethylenically unsaturated group, termed "secondary" herein, is capable of participating in a cross-linking reaction upon oxidative air curing. The chip-resistance thus obtained compliments the chip resistance provided by the added monomers and oligomers described above.

DESCRIPTION OF THE PREFERRED EMBODIMENTS

Base alkyds that are useful in the manufacture of coating compositions are well known, and reference is made particularly to U.S. Pat. No. 4,511,692, the teachings of which are incorporated herein by reference, for a discussion of such compositions. Base alkyds in general are derived from the reaction of polyols with polybasic acids, diacids and monoacids, including fatty acids. The fatty acids which are employed provide base alkyds with a measure of unsaturation, enabling them to undergo copolymerization with ethylenic unsaturated monomers and to ensure satisfactory oxidative cure. As taught in U.S. Pat. No. 4,511,692, one or more ethylenically unsaturated monomers such as acrylates and vinyls (at least one of which has sufficient amine functionality as to render the coating composition dispersible in water and cationically electrodepositable) are reacted in the presence of the base alkyd to result in addition polymerization of the monomers and to cause chemical bonding, via grafting, of the ethylenically unsaturated monomers to the base alkyd, yielding the modified alkyd. Amine functional acrylates and methacrylates are particularly preferred. As used herein, "(meth)acrylate" refers both to methacrylates and acrylates.

In the manufacture of the base alkyd, fatty acids having some unsaturation (exhibiting an iodine value of at least about 25), may be combined with one or more polyhydric alcohols, one or more polybasic acids, a grafting agent and, optionally, a non-fatty monoacid in a reaction vessel under an inert atmosphere. Other monoacids can be included as is known in the art, and the presently preferred non-fatty monoacid is benzoic acid.

Polyhydric alcohols useful in preparation of the base alkyd include those having at least two carbon atoms per molecule and also having two to six hydroxyl groups per molecule. Examples include glycerin, pentaerythritol, trimethylolpropane, trimethylpentane diol, cyclohexane dimethylol, trimethylolethane, dipentaerythritol, ethylene glycol, propylene glycol, 1,3-butylene glycol, neopentyl glycol, hydrogenated bisphenol A, 2,2-dimethyl-3-hydroxypropyl-2,2-dimethyl-3-hydroxy propionate, dimethylolpropionic acid and the like. Preferred polyhydric alcohols include pentaerythritol, trimethylolpropane, cyclohexane dimethylol and trimethylolethane.

Preferred fatty monobacic acids which have a high linoleic acid content include high purity tall oil fatty acids and soy bean fatty acids.

Grafting agents, as referred to above, include fatty acids such as conjugated tall oil (e.g., the conjugated fatty acid sold under the trademark PAMOLYN 380 by Hercules, Inc.), the latter composition having a high concentration of unsaturation at positions 9 and 11 of a $C_{18}$ fatty acid. Other desired grafting agents include monoacids such as crotonic acid and sorbic acid, ethylenically unsaturated diacids such as maleic, itaconic and tetrahydrophthalic acids and anhydrides, and ethylenically unsaturated isocyanates such as isocyanatoethyl methacrylate.

Suitable polybasic acids include saturated and aromatically unsaturated acids and anhydrides having at least two carboxyl groups per molecule. Examples include malonic, glutaric, pimelic, suberic, azelaic, sebacic, succinic, adipic, phthalic, isophthalic, terephthalic, and hexahydrophthalic acids, trimellitic anhydride, 3,3,4,4-benzophenone tetracarboxylic acid dianhydride and dimerized fatty acids. Desirably, from about 5% to about 60% by weight of base alkyds of the invention are derived from polybasic acids, from about 5% to about 60% is derived from polyhydric alcohols, from about 10% to about 90% is derived from monobasic fatty acids, from 0.5% to about 60% is derived from grafting agents, and, optionally, from about 0% to about 50% is derived from non-fatty monoacids. The base alkyd manufacturing process commonly involves blending together the ingredients referred to above and reacting the same at a temperature up to about 460° F. to an acid value of approximately 10, following which the reaction mixture is cooled and an appropriate solvent is added to control viscosity. The following Table I lists preferred and most preferred ingredients for a typical base alkyd, reference being made to U.S. Pat. No. 4,511,692:

TABLE I

| Ingredient | Percent by Weight of Base Alkyd | |
|---|---|---|
| | Preferred | Most Preferred |
| Polybasic Acid | 5 to 60 | 15 to 30 |
| Polyhydric Alcohol | 5 to 60 | 15 to 30 |
| Fatty Acid | 10 to 90 | 40 to 75 |
| Grafting Agent | 0.5 to 60 | 2 to 10 |
| Non-fatty Monobasic Acid | 0 to 50 | 5 to 35 |

Once the base alkyd has been formed, it may be reacted with one or more ethylenically unsaturated monomers to form a modified alkyd composition, the monomers including at least one amine-functional unsaturated monomer in sufficient quantity to render the coating composition water dispersible and cationically electrodepositable. Amine-functional ethylenically unsaturated monomers include dimethylaminoethyl methacrylate and acrylate, tertiary butylaminoethyl methacrylate and dimethylaminopropyl methacrylamide. Non-amine functional monomers include acrylates such as methyl methacrylate, butyl methacrylate, butyl acrylate, lauryl methacrylate and the like. Styrene may be used as an ethylenically unsaturated monomer. The weight ratio of ethylenically unsaturated monomers to base alkyd may range from about 9/1 to 1/9 and preferably from 8/2 to 3/7. The addition polymerization reaction involving the unsaturated functionality of the base alkyd and ethylenically unsaturated monomers such as those described above proceeds preferably via free-radical initiation utilizing such initiators as 2,2-azobisisobutyronitrile and dicumyl peroxide. The following Table II lists preferred and most preferred ethylenically unsaturated monomer ingredients in typical blend of ethylenically unsaturated monomers to be reacted with a base alkyd to form a modified alkyd:

TABLE II

| Monomer | Percent by Weight of Monomers | |
|---|---|---|
| | Preferred | Most Preferred |
| Acrylic or Methacrylic | 0 to 95 | 10 to 80 |
| Vinyl (e.g., styrene) | 0 to 95 | 10 to 80 |
| Amine Functional | 5 to 95 | 5 to 45 |

It has been found that added chip resistance results from the inclusion, with the amine-functional and other unsaturated monomers referred to above that are reacted with the base alkyd, of a monomer having a molecular weight of at least 200 and having at least two different ethylenically unsaturated groups. One of the unsaturated groups, commonly a $CH_2=CR$ group in which R is hydrogen or methyl, is capable of participating in a free radical initiated addition polymerization reaction. Groups of this type may be derived from (meth)acrylyl groups (as from, for example, glycidyl methacrylate) or from allyl groups, (as from, for example, allyl alcohol). For brevity, these active unsaturated groups may be termed "primary." To avoid gellation, primary unsaturated groups are present in a concentration not exceeding about one group per molecule. The other ethylenically unsaturated group, commonly a —C—CH═CH—C— group, is substantially less reactive but is capable of cross-linking with similar groups upon oxidative air curing. Groups of the latter type (referred to herein as "secondary" groups) desirably are provided by such acids as sorbic and crotonic acids and by unsaturated fatty acids. Fatty acids are typically in the molecular weight range of about 150 350 and preferably in the range of about 250–300, and are derived from tall oil, linseed oil, soybean oil, and the like. Linoleic fatty acids derived from vegetable oil have given good results. Typically, fatty acids have an average of 1–3 unsaturated groups per molecule; commercially available fatty acids commonly include some saturated fatty acids such as stearic acid.

Monomers containing both primary and secondary ethylenically unsaturated groups desirably are derived from the reaction of a first compound having a primary unsaturated group with a second compound having a secondary unsaturated group. The first mentioned compounds may include functional (meth)acrylates such as glycidyl methacrylate and hydroxy alkyl (meth)acrylates and allyl alcohol and its derivatives such as allyl glycidyl ether. The second mentioned compounds include unsaturated acids such as crotonic, itaconic and sorbic acids and their derivatives and unsaturated fatty acids and their derivatives. Monomers derived from the reaction of glycidyl methacrylate with an unsaturated fatty acid have been used to provide coatings exhibiting excellent resistance to chipping.

Monomers with primary and secondary ethylenic unsaturation desirably are used in concentrations of up to about 50% by weight of the base alkyd, preferably in the range of from about 10% to about 30% by weight of the base alkyd, enough of the monomer being used to provide significant improvement in chip resistance. The primary and secondary unsaturated monomers may be used either with or without the use of the elastomers referred to below.

Increased chip resistance of the final product can also be improved by chemically incorporating in the base alkyd a preferably pre formed elastomer having functional groups reactive with hydroxyl or carboxyl groups of the base alkyd, the elastomer being employed in sufficient guantity so as to significantly increase chip resistance. The functional groups of the pre-formed elastomers preferably are carboxyl groups, hydroxyl groups, or amine groups, and the average functionality of the elastomers generally ranges from about 1.8 to about 2.2 groups per molecule. The elastomers that are employed desirably are generally linear, and the functional groups referred to above preferably are terminal groups. Polybutadiene and polybutadiene/acrylonitrile copolymers are preferred, and may have molecular weights generally in the range of from about 1000 to about 10,000; molecular weights in the range of 3,000-5,000 have given good results. Various polymers of butadiene, isoprene, isobutylene and the like having approximately two functional groups (e.g., from about 1.8 to about 2.2 groups) per molecule are contemplated for use in the present invention. Polybutadiene and polybutadiene/acrylonitrile copolymers having approximately two carboxyl groups per molecule are preferred. One such polymer, sold as CTBN 1300X31 by B. F. Goodrich, is a carboxyl-terminated polymer derived from approximately 90% butadiene and about 10% acrylonitrile, the functionality of the polymer being approximately 1.9 and the number average molecular weight being approximately 3800, The pre formed elastomers with functional groups, when used in the instant invention, preferably are added and reacted with existing hydroxyl or carboxyl groups of the other base alkyd reaction ingredients during preparation of the base alkyd and before reaction of the base alkyd with unsaturated and amine-functional monomers. When employed in the instant invention, the pre-formed elastomers are used in amounts providing significant chip resistance to the final coating and can be employed with or without other chip-resistant additives that improve resistance to chipping The elastomers desirably are used in amounts ranging from about 5% to about 70% by weight of the base alkyd, more preferably in the range of from about 7% to about 20% by weight of the base alkyd, with excellent results having been obtained at a concentration of about 10% based on the weight of the base alkyd.

As will now be understood, the functional elastomers referred to above and the compounds having both primary and secondary ethylenically unsaturated groups, when employed, are chemically incorporated in the modified alkyd composition via covalent bonding and form an integral part of that composition.

To the alkyd which has been reacted with an amine-functional unsaturated monomer and which may chemically incorporate one or more of the functional elastomers and/or primary and secondary ethylenically unsaturated compounds, is added a sufficient guantity of an agent promoting chip resistance and including an ethylenically unsaturated, addition-polymerizable (under free radical initiation) monomer or oligomer to improve chip resistance of the resulting product. The monomers and oligomers, which preferably have substantially linear backbones and molecular weights of at least about 150, may be reactive with the fatty acid unsaturation of the alkyd and desirably are soluble in aromatic organic solvents such as toluene or in aliphatic solvents such as alcohols, glycol ethers and ketones. The substantially linear backbone desirably is largely or predominantly polymethylene. The monomers or oligomers contain an average of from about 1.2 to about 4 (and preferably about 1.5 to about 2.5) ethylenically unsaturated groups per molecule, and may include various other functional groups.

A preferred class of monomers or oligomers are compounds of the formula in which R is an ethylenically unsaturated group such as vinyl, acrylyl or methacrylyl and R' is the same as R or is a hydroxyl, amino, carboxyl, glycidyl, or isocyanate functional group or is H or methyl. Long chained diol di(meth)acrylates are particularly preferred, particularly those diol di(meth)acrylates having from about 4 to about 20 carbon atoms, preferably predominantly in the form of methylene groups, between the acrylyl end groups. The $C_{14}$ diol diacrylate known as C 2000 and sold commercially by Sartomer Company has given particularly good results.

A highly preferred class of monomers and oligomers comprises the polyol tri(meth)acrylates and polyol tetra(meth)acrylates such as pentaerythritol tetraacrylate, trimethylolpropane triacrylate, trimethylolethane triacrylate, and tri(meth)acrylates and tetra(meth)acrylates of alkoxylated polyols, such as ethoxylated trimethylolpropane triacrylate. The polyol tri(meth)acrylates and tetra(meth)acrylates are particularly valuable because they enable the compositions of the invention to be cured at relatively low temperatures, eg., down to 160 ° F. The use of trimethylolpropane triacrylate in this manner, for example, has permitted acceptable curing to be obtained by treating wet films of the composition in a forced air oven at 160-180 ° F. for 45 minutes, or at 250° F. for 30 minutes.

Another preferred class of monomers and oligomers which may be added to the modified alkyd composition comprises the reaction products of a polyisocyanate with (meth)acrylic acid or a (meth)acrylate. Particularly preferred is the reaction product of the caprolactone adduct of hydroxyethyl acrylate (e.g., Tone M-100, Union Carbide) with a biuret of 1,6-hexamethylene diisocyanate (e.g., Desmodur L-2291, Mobay Corp.). This specific product, having a substantially linear backbone (including linear segments having acrylyl terminal groups) has given good results. Preferred are the reaction products of polyfunctional isocyanates (having two or more isocyanate groups per molecule) with hydroxyalkyl (meth)acrylates, the alkyl portion of which includes from about 2 to about 50, desirably from about 2 to about 14, carbon atoms.

One or two or more monomers and oligomers of the types described may be employed in the present invention, it being only required that the agent guantity be sufficient to significantly improve the chip resistance of the resulting coating material. Monomers and oligomers of the types described may be used in amounts ranging from about 3% to about 50% of the modified alkyd, the preferred range being from about 3% to about 25% and the most preferred range being from about 10% to about 25%. To determine whether chip resistance is substantially improved through the addition of a candidate material, parallel samples of alkyd based coating compositions in accordance with the invention can be prepared, one composition containing the candidate material. After electrodeposition of the compositions upon suitable substrates followed by equivalent curing cycles, the coated samples are tested to determine their resistance to chipping when struck by gravel, as described more fully below.

Resistance to chipping is an outstanding feature of coating compositions of the present invention. To test the chip resistance of coatings, a test device similar to that shown and described in ASTM Test D 3170-74 is employed. The test device comprises a box-like enclosure with a closable top to prevent the escape of gravel from the container. Near one end, the container is provided with a mounting bracket for holding coated test panels. Near the other end of the container is mounted a section of standard 2-inch pipe, the pipe being horizontally positioned and aimed perpendicular to and at the approximate center of the coated surface of a mounted test target. A "T" coupling is provided at the rearward end of the pipe section with the leg of the "T" oriented upwardly to support a funnel through which gravel can be poured into the "T" connection itself. A compressed air line is attached to the remaining open end of the "T" connector in such a fashion that as gravel drops from the funnel into the "T" section, compressed air blowing through the "T" section entrains the gravel and impels it against the test panel. Water-eroded alluvial road gravel passing through a ⅝-inch space screen but retained on a ⅜-inch space screen is employed. The air pressure to the "T" coupling is maintained at approximately 90 psi.

Testing is performed at room temperature. For each test, two pints of gravel are employed, the gravel being fairly uniformly poured into the funnel over a 20 second period, air under pressure being forced through the "T" connector to impel the stones through the pipe and against the test panel positioned 13¾ inches away from the end of the pipe from which stones are impelled. After each test, the test panel is removed and graded as to the severity of chipping on a scale of from 0 to 9. Grading is accomplished by visually comparing the tested panels with a series of ten photographs of panels showing varying degrees of chip damage. The least chip damage is designated "9" and the most chip damage is designated "0", there being visually perceptible differences between the amount of chip damage in succeedingly numbered photographs. Chipping damage of the panels graded "0" was depicted in the photographs as being extensive, the holes resulting from different stone impacts tending to merge into one another and extending completely through the coating to expose the metal panel. It has been visually estimated that about 40% of the panel surfaces graded "0" were laid bare to the metal. Panels graded "9" showed barely visible chip damage, none of the chips being sufficiently deep as to expose the metal substrate of the panel. The differences in chip resistance between any two grade numbers in sequence was significant, and chip resistance differences between panels differing by two or more grade numbers were deemed to be substantial.

The invention may be more readily understood by reference to the following, non limiting examples, wherein parts are expressed as parts by weight:

EXAMPLE I

This example shows the preparation of a base alkyd resin. To a reaction vessel equipped with thermometer, stirrer, reflux condensor, nitrogen inlet and Dean Stark water separator was added 254 parts of Hercules, Inc.'s Pamolyn 380 brand fatty acid (having a high concentration of unsaturation at positions 9 and 11 of a C-18 fatty acid), 1137 parts of Emersol 315 brand fatty acid (Emery Chemicals), 885 parts of benzoic acid, 746 parts of isophthalic acid and 850 parts of pentaerythritol. The mixture was heated to about 250° F., following which there was added to the mixture 3.8 parts of Fascat 4201 brand catalyst (dibutyltin oxide, a product of M & T Chemicals, Inc.). The mixture was heated, and xylene (80 parts by weight) was added to permit continuous removal of water as an azeotrope, the temperature increasing to 460° F. The reaction was continued until an acid value of about 5 to 7 and a viscosity of about X to Y on the Gardner scale was obtained with a sample cut to about 70% solids with xylene. The resin was then cooled, and 794 parts of the propyl ether of propylene glycol (Propyl Propasol, Union Carbide Corp.) was added when the temperature dropped below about 300° F.

EXAMPLE II

This example shows the preparation of a base alkyd using, as a reactant, an elastomer reactive with hydroxyl or carboxyl groups of the base alkyd to impart additional chip resistance to the final coating. In this example, the elastomer is a carboxyl-terminated butadiene/acrylonitrile copolymer sold as CTBN 1300 X31 by B. F. Goodrich.

To a reaction vessel equipped with thermometer, stirrer, reflux condensor, nitrogen inlet and Dean Stark water separator was added 149.7 parts of Pamolyn 380 brand fatty acid, 670.3 parts of Emersol 315 brand fatty acid, 413.6 parts of benzoic acid, 376.5 parts of isophthalic acid, 439 parts of pentaerythritol and 200 parts of CTNB 1300 X31. The mixture was heated to about 250° F., following which 2.0 parts by weight of Fascat 4201 catalyst was added and further heat was applied to the reaction vessel. 60 parts of xylene were added at a rate permitting the azeotropic removal of water, the temperature increasing to about 460° F. The reaction continued until an acid value of from about 5 to about 7 and a viscosity of about X to about Y on the Gardner scale was obtained on a sample of the mixture cut to about 70% solids with xylene. The reaction mixture was cooled, and 620 parts of the propyl ether of propylene glycol was added when the temperature fell below about 300° F.

EXAMPLE III

This example illustrates the preparation of a "grind" vehicle of the type used in paints, utilizing an alkyd. To the reaction vessel of Example I is added 1391 parts of Emersol 315 fatty acid, 885 parts of benzoic acid, 746 parts of isophthalic acid and 850 parts of pentaerythritol. After heating the mixture to about 250° F., 3.8 parts of Fascat 4201 brand catalyst are added with additional heating, and 80 parts of xylene are added to maintain an azeotrope, the temperature rising to about 460° F. The reaction continues to an acid value of about 5–7 and a viscosity of about X-Y on the Gardner scale with a sample cut to about 70% solids with xylene. The resin is cooled, and once the temperature has fallen below about 300° F., 1400 parts of the propyl ether of propylene glycol are added.

EXAMPLE IV

The following example illustrates the reaction of the base alkyd prepared in Example I with ethylenically unsaturated monomers including an amine functional monomer. The following reaction portions were prepared:

| Portion I | |
|---|---|
| Propyl ether of propylene glycol | 604 parts |
| Portion II | |
| Methyl methacrylate | 555 parts |
| Styrene | 200 parts |
| Dimethylaminoethyl methacrylate | 245 parts |
| Vazo 67 brand polymerization initiator (Azo-bis-2-methyl butyronitrile, DuPont) | 32.2 parts |
| Alkyd prepared in Example I | 1875 parts |
| Portion III | |
| Propyl ether of propylene glycol | 40 parts |
| Portion IV | |
| Dicumyl peroxide catalyst (DiCup R brand, Hercules Chemical) | 30 parts |
| Propyl ether of propylene glycol | 100 parts |

Portion I is charged into a reactor equipped as described in Example I, and is heated to about 200° F. under an inert atmosphere. Portion II is added incrementally (10% initially) over the next 2 hours and 55 minutes, the temperature remaining at about 200° F. Portion III is then added and the batch is held for an additional hour at 200° F. One half of Portion IV is then added and the temperature is raised to about 280° F. over a period of 30 minutes. After an hour at this temperature, the remainder of Portion IV is added, and the temperature is maintained at 280° F. for 2 hours before cooling.

EXAMPLE V

This example illustrates the reaction of the carboxyl-terminated butadiene/acrylonitrile copolymer-modified base alkyd (as prepared in Example II) with ethylenically unsaturated monomers including an amine functional monomer in the manner set out in Example IV. The procedure of Example IV was followed, except that Portion III was eliminated. The following portions were employed:

| Portion I | |
|---|---|
| Propyl ether of propylene glycol | 234 parts |
| Portion II | |
| Methyl methacrylate | 277.5 parts |
| Styrene | 100 parts |
| Dimethylaminoethyl methacrylate | 122.5 parts |
| Vazo 67 Brand polymerization initiator | 16.1 parts |
| CTBN-modified alkyd prepared in Example II | 1000 parts |
| Portion IV | |
| Dicumyl peroxide initiator | 15 parts |
| Propyl ether of propylene glycol | 50 parts |

EXAMPLE VI

This example illustrates the preparation of a monomer having two different ethylenically unsaturated groups, one derived from glycidyl methacrylate and the other derived from a fatty acid. To a reaction vessel equipped with stirrer, thermometer, nitrogen inlet and condensor was added 300 parts of glycidyl methacrylate, 590 parts of Emersol 315 brand fatty acid, 1.15 parts of the methyl ether of hydroquinone, and 1.5 parts of the catalyst tetrabutylammonium chloride. The ingredients are slowly heated over a period of about 1 hour to 150° C., and are held for two hours before cooling.

EXAMPLE VII

This example illustrates the reaction of a base alkyd, typified as that of Example I, with ethylenically unsaturated monomers of which at least one is an amine-functional monomer and another is the monomer prepared in Example VI. The procedure of Example IV is repeated exactly, except that the portions used are as follows:

| Portion I | |
|---|---|
| Propyl ether of propylene glycol | 297 parts |
| Portion II | |
| Methyl methacrylate | 77.5 parts |
| Styrene | 100 parts |
| Dimethylaminoethyl methacrylate | 122.5 parts |
| Vazo 67 polymerization initiator | 16.1 parts |
| Alkyd prepared by Example I | 943 parts |
| Monomer prepared in Example VI | 200 parts |
| Portion III | |
| Propyl ether of propylene glycol | 20 parts |
| Portion IV | |
| Dicumyl peroxide initiator | 15 parts |
| Propyl ether of propylene glycol | 50 parts |

EXAMPLE VIII

This example illustrates the preparation of the reaction product of a polyisocyanate with an acrylate derivative, the reaction product contributing to chip resistance of the resulting coating product. To a reactor equipped with a thermometer, agitator, nitrogen inlet and reflux condensor is added 482 parts of the caprolactone adduct of hydroxy ethyl acrylate (Tone M 100, a product of Union Carbide), 100 parts of toluene, and 0.1 parts of dimethyl tin dilaurate (UL-28, a product of Witco Chemical). The reaction mixture is heated to about 65° C. under an inert atmosphere, following which there is added to the reaction vessel over a 2-3 hour period at 65°-70° C. with agitation a mixture of 79 parts of toluene and 234 parts of Desmodur L-2291 (Mobay Corp.), a biuret of 1,6-hexamethylene diisocyanate. The reaction mixture is held at about 70° C. until no isocyanate peak is detected by infrared spectroscopy. The reaction mixture is cooled, and is found to have a viscosity of U-V on the Gardner scale (at 80% solids).

EXAMPLE IX

This example illustrates the preparation of a pigmented dispersion prepared from the grind vehicle of Example III. To a conventional Cowles mixer is added 404 parts of the alkyd of Example III, 116.8 parts of phthalo green and 4 parts of carbon black, the mixer being run at high speed for 15-30 minutes to thoroughly mix the ingredients. To the resulting mixture is added, in order with mixing intervals between additions, 290 parts of 2-ethyl hexyl alcohol, 494 parts of medium chrome yellow and 111.4 parts of titanium dioxide (rutile). The mixture is mixed until uniform and then is passed through a conventional sand mill and milled to a 7+Hegman particle size (less than about 12.5 microns).

EXAMPLE X

This example illustrates the preparation of a coating composition which does not incorporate the chip-resistant features of the invention. This example is included as a "control" against which the chip resistance of coatings of the invention may be compared.

| Portion I | |
|---|---|
| Alkyd from Example IV | 378.6 parts |
| Pigment dispersion from Example IX | 61.6 parts |
| 2-ethyl hexyl alcohol | 12.1 parts |
| Propionic acid | 10.3 parts |
| Portion II | |
| Manganese drier (Manganese Hydro-cure, Mooney Chemicals, Inc.) | 5.4 parts |
| Drier promoter (a 1,10-phenanthroline product available from Vanderbilt Chemical Co. under the trademark ACTIV 8) | 0.67 parts |
| Ortho-t-butyl phenol | 1.07 parts |
| Portion III | |
| Deionized water | 2530.26 parts |

Figure 1:
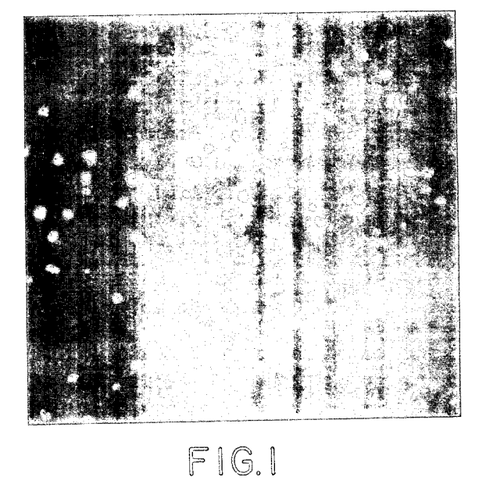
FIGS. 1–4 are a photographic representations of sections of steel panels that were coated with the coating compositions of Examples X-XIII, respectively, and subjected to a chipping test.

The ingredients of Portion I are mixed in order in a mixing vessel until uniform. Portion II is added in order, and mixed until uniform, following which Portion III is slowly added. The resulting coating composition has a solids content of 10%, a pH of about 4.9, and a conductivity of 700–800 microsiemens/cm ("ms/cm"). A steel panel (Parker Chemical Company, Brand EP 10, P60) was coated for 2 minutes via electrodeposition with the composition at 75° F. at 100–120 volts. The panel was then rinsed with deionized water and force dried for 30 minutes at 250° F. A 1-mil film resulted. Gloss readings were taken with a Hunter D48D gloss meter, and values of 90+/80+ at 60 degrees and 20 degrees, respectively, were recorded. The coated panel was subjected to the chip test described above, and the results are reported in Example XIV. FIG. 1 is a photograph of a portion of the panel, showing substantial chip damage.

EXAMPLE XI

This example illustrates a coating composition similar to that of Example X, but containing the urethane acrylate oligomer of Example VIII to improve chip resistance of the product.

| Portion I | |
|---|---|
| Alkyd resin from Example IV | 302.9 parts |
| Urethane acrylate oligomer from Example VIII | 64.3 parts |
| Pigment dispersion from Example IX | 61.6 parts |
| 2-ethyl hexyl alcohol | 2.0 parts |
| Propionic acid | 8.2 parts |
| Portion II | |
| Manganese drier, 5% | 5.4 parts |
| ACTIV 8 drier promoter | 0.67 parts |
| Ortho-t-butyl phenol | 1.07 parts |
| Portion III | |
| Deionized water | 2553.86 parts |

Figure 2:
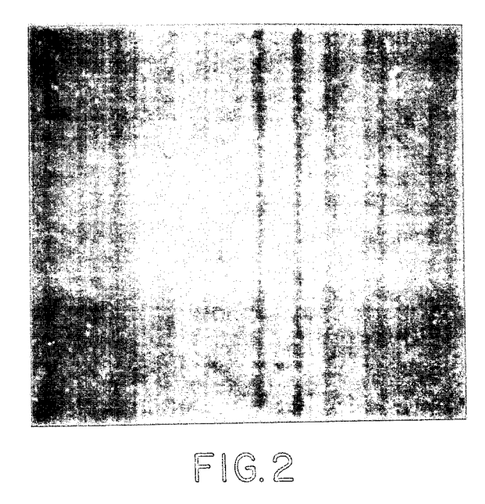

Portion I is mixed in order in a mixing vessel until uniform. Portion II is added in order with mixing, and mixing is continued until the mixture is uniform. Portion III is then slowly added. The resulting composition has a solids content of 10%, a pH of 4.9, and a conductivity of 700–800 ms/cm. The coating is electrically deposited upon a steel panel in a manner identical to Example X, resulting in a 1.0 mil film. Gloss readings of 90+/80+ at 60 degrees and 20 degrees, respectively, were measured. Resistance to chipping was tested as described above, and the results are reported in Example XIV. FIG. 2 is a photograph of a portion of the panel, which exhibits little damage.

EXAMPLE XII

Figure 3:
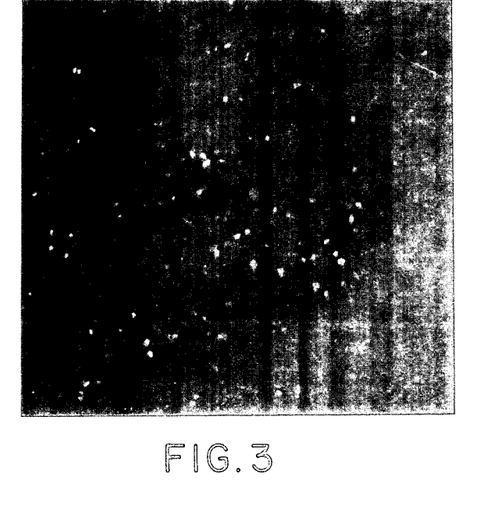

Example XI was repeated exactly except that 51.5 parts by weight of a $C_{14}$ diol diacrylate oligomer, "C-2000", Sartomer Company, was substituted for the 64 3 parts of urethane acrylate oligomer used in Example XI. Also, the amount of deionized water used in this example was 2566.66 parts by weight. The resulting paint has a solids content of 10%, a pH of 4.9, and a conductivity of 700–800 ms/cm. Electrodeposition of the coating upon a steel panel was carried out as in Examples X and XI. A 1.0 mil film resulted which exhibited gloss readings of 90+/80+ at 60 degrees and 20 degrees, respectively. Resistance to chipping was measured and is reported below in Example XIV. Minor chip damage is shown in FIG. 3, a photograph of a portion of the panel.

EXAMPLE XIII

This example illustrates a coating composition in which the resistance to chipping is improved not only by the addition of an addition polymerizable oligomer as taught in Example XII, but also by the further use of a preformed elastomer having functional groups and which is incorporated in the alkyd during its preparation, the elastomer being exemplified as the carboxyl-terminated butadiene/acrylonitrile copolymer used in manufacturing the alkyd of Example II and utilized in Example V.

| Portion I | |
|---|---|
| Acrylated alkyd of Example V | 350 parts |
| Sartomer C-2000 acrylate oligomer utilized in Example XII | 27 parts |
| Pigment dispersion from Example IX | 61.6 parts |
| 2-ethyl hexyl alcohol | 5.0 parts |
| Propionic acid | 9.1 parts |
| Portion II | |
| Identical to that of Example XI | 7.14 parts |
| Portion III | |
| Deionized water | 2540.16 parts |

Figure 4:
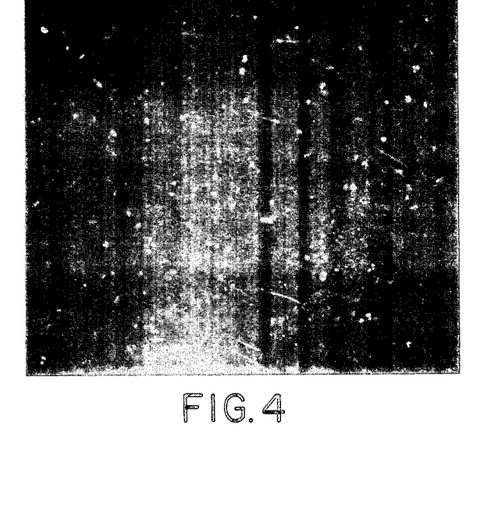

The ingredients of Portion I were mixed in order in a mixing vessel until uniform. The ingredients of Portion II were then added in order and mixed until uniform. Portion III was slowly added, with mixing. The resultant coating composition exhibited a solids content of 10%, a pH of 4.9 and a conductivity of 700–800 ms/cm. Panels were coated via electrodeposition a in Example X, and the 1.0 mil film which resulted exhibited gloss readings of 90+/80+ at 60 degrees and 20 degrees, respectively. Resistance to chipping was measured and is reported in Example XIV. The tested panel is shown in FIG. 4.

EXAMPLE XIV

The coated panels resulting from Examples X, XI, XII and XIII were subjected to the testing procedure described above to determine the resistance of the coatings to chipping. Several panels from each example were tested. The coatings were rated by number with 0 showing the poorest chip resistance and 9 showing the best chip resistance. The following results were obtained:

| Example | Chip Resistance Rating |
|---|---|
| X (control) | 3 |
| XI | 8 |
| XII | 6 |
| XIII | 7 |

EXAMPLE XV

This example illustrates a coating composition similar to that of Example XIII but in which the Sartomer C-2000 acrylate oligomer is replaced with a polyol triacrylate, typified as trimethylolpropane triacrylate.

| Portion I | |
|---|---|
| Acrylated alkyd of Example V | 332 parts |
| Trimethylolpropane Triacrylate | 27 parts |
| Pigment dispersion from Example IX | 61.6 parts |
| Propionic Acid | 9.1 parts |
| Portion II | |
| Manganese drier, 5% | 5.4 parts |
| Activ 8 drier promotor | 1.3 parts |
| Ortho-T-Butyl phenol | 1.07 parts |
| Portion III | |
| Deionized water | 2562.53 parts |

The ingredients of Portion I were mixed in order in a mixing vessel until uniform. The ingredients of Portion II were then added in order and mixed until uniform. Portion III was slowly added, with mixing. The resulting coating composition exhibited a solids content of 10%, a pH of 4.9 and a conductivity of 700–800 ms/cm. Panels were coated as in Example X, resulting in a 1.0 mil film. Gloss readings of 90+/70+ at 60 degrees and 20 degrees, respectively, were measured. Resistance to chipping was measured, and the visual appearance of the panel indicated slightly less resistance to chipping than the panel shown in FIG. 3.

EXAMPLE XVI

Example XV was repeated exactly, except that the trimethylolpropane triacrylate was replaced with an equal weight of a polyester tetraacrylate, sold by Radcure Specialties, Inc. under its trade name EBECRYL 810. The resulting paint had a solids content of 10%, a pH of 4.9, and a conductivity of 700–800 ms/cm. Gloss readings of 90+/80+ were measured at 60 degrees and 20 degrees, respectively. Resistance to chipping was measured and was found comparable to the results for Example XIII.

While preferred embodiments of the present invention have been described, it should be understood that various changes, adaptations and modifications may be made therein without departing from the spirit of the invention and the scope of the appended claims.

What is claimed is:

1. A cationic electrodeposition coating composition comprising, in aqueous dispersion:
   a. A modified alkyd composition derived from the reaction of a polyol with at least one unsaturated fatty acid and reacted with addition polymerizable ethylenically unsaturated monomers including an amine-functional unsaturated monomer in a guantity sufficient to render the coating composition water-dispersible and cationically electrodepositable; and
   b. A reactive agent in sufficient guantity to significantly improve the resistance to chipping of a cured coating resulting from the electrodeposition of the composition upon a metal substrate, the agent including at least one ethylenically unsaturated, addition polymerizable monomer or oligomer having a substantially linear backbone, a molecular weight of at least about 150, and being polymerizable under free radical initiating conditions.

2. The composition of claim 1 wherein the at least one monomer or oligomer contains a backbone that is predominantly polymethylene and contains an average of at least about 1.2 ethylenically unsaturated groups per molecule.

3. The composition of claim 2 wherein the monomer or oligomer is a compound of the formula $$R-(CH_2)_x-R_1$$

wherein x is 8 or more, R is an ethylenically unsaturated group, and $R_1$ is an ethylenically unsaturated group, hydrogen, methyl, or a hydroxyl, carboxyl, amine or isocyanate functional group.

4. The composition of claim 3 wherein the monomer or oligomer is a $C_{12}$-$C_{18}$diol diacrylate or dimethacrylate.

5. The composition of claim 1 wherein the monomer or oligomer is the reaction product of a polyisocyanate and an acrylate or methacrylate.

6. The composition of claim 1 wherein the alkyd is formed to contain an elastomer having functional groups reacted with hydroxyl or carboxyl group of the alkyd and in sufficient guantity to substantially improve said chip resistance of the cured coating.

7. The composition of claim 6 wherein said elastomer is the polymerization or copolymerization product of butadiene.

8. The composition of claim 6 wherein said elastomer is the addition copolymerization reaction product of butadiene and acrylonitrile.

9. The composition of claim 1 or claim 6 wherein said addition-polymerizable, ethylenically unsaturated monomers from which the modified alkyd composition is derived include a monomer having a molecular weight of at least 200 and having at least one primary and at least one secondary ethylenically unsaturated group, said monomer being present in sufficient guantity to significantly increase chip resistance.

10. The composition of claim 9 wherein said monomer having at least one primary and at least one secondary ethylenically unsaturated group comprises the reaction product of an acrylate or an allyl alcohol or its derivatives with an unsaturated acid.

11. The coating composition of claim 9 wherein the monomer having at least one primary and at least one secondary ethylenically unsaturated group is the reaction product of glycidyl methacrylate with an unsaturated fatty acid.

12. A cationic electrodeposition coating composition comprising, in aqueous dispersion:
   a. A modified alkyd composition derived from the reaction of a polyol with at least one unsaturated fatty acid and reacted with addition polymerizable ethylenically unsaturated monomers including an amine functional unsaturated monomer in a guantity sufficient to render the coating composition water-dispersible and cationically electrodepositable; and b. A reactive agent in sufficient quantities to significantly improve the resistance to chipping of a cured coating resulting from the electrodeposition of the composition upon a metal substrate, the agent including at least one ethylenically unsaturated, addition polymerizable monomer or oligomer having a substantially linear backbone that is predominantly polymethylene, which has a molecular weight of at least about 150 and an average of at least about 1.2 ethylenically unsaturated groups per molecule, and which is polymerizable under free radical initiating conditions.

13. The composition of claim 12 wherein the monomer or oligomer of the reactive agent is the reaction product of a polyisocyanate and an acrylate or methacrylate.

14. The composition of claim 12 wherein the monomer or oligomer is a $C_{12}$-$C_{18}$ diol diacrylate or dimethacrylate.

15. The composition of any of claims 12-14 wherein the alkyd is formed to contain the polmerization or copolymerization product of butadiene reacted with hydroxyl or carboxyl groups of the alkyd and in sufficient guantity to substantially improve said chip resistance of the cured coating.

16. The composition of claim 15 wherein said product is the addition copolymerization reaction product of butadiene and acrylonitrile.

17. The coating composition of any of claims 12-14 wherein said addition polymerizable, ethylenically unsaturated monomers from which the modified alkyd composition is derived include a monomer having a molecular weight of at least 200 and having at least one primary and at least one secondary ethylenically unsaturated group, the monomer being present in sufficient guantity to significantly increase chip resistance.

18. The coating composition of claim 17 wherein the monomer having at least one primary and at least one secondary ethylenically unsaturated group is the reaction product of glycidyl methacrylate with an unsaturated fatty acid.

19. A cationic electrodeposition coating composition comprising, in aqueous dispersion:

a. A modified alkyd composition derived from the reaction of a polyol with at least one unsaturated fatty acid and reacted with addition polymerizable ethylenically unsaturated monomers including an amine-functional unsaturated monomer in a guantity sufficient to render the coating composition water-dispersible and cationically electrodepositable; and b. A reactive agent in sufficient quantities to significantly improve the resistance to chipping of a cured coating resulting from the electrodeposition of the composition upon a metal substrate, the agent including at least one ethylenically unsaturated, addition polymerizable monomer or oligomer having a predominantly polymethylene backbone, which was a molecular weight of at least about 150 and an average of at least about 1.2 ethylenically unsaturated groups per molecule, which is polymerizable under free radical initiating conditions, and which is a polyol triacrylate or a polyol tetraacrylate.

20. The composition of claim 19, in which the monomer or oligomer of the reactive agent is trimethylolpropane triacrylate, trimethylolethane triacrylate, or pentaerythritol.

* * * * *